(12) United States Patent
Kawano

(10) Patent No.: US 6,590,619 B1
(45) Date of Patent: Jul. 8, 2003

(54) BROADCAST SOUND SIGNAL PROCESSING CIRCUIT

(75) Inventor: Tsutomu Kawano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/392,792

(22) Filed: Sep. 9, 1999

(30) Foreign Application Priority Data

Apr. 26, 1999 (JP) ............................................ 11-117764

(51) Int. Cl.[7] .............................. H04N 5/60; H04N 5/50; H04N 5/44; H04N 5/62; H04B 1/06; H04B 7/00; H03G 3/20

(52) U.S. Cl. ........................ 348/738; 348/735; 348/736; 348/737; 455/232.1; 455/234; 455/239.1; 455/249.1; 330/129; 330/140

(58) Field of Search ................................ 348/738, 735, 348/736, 737; 455/232.1, 234.1, 142, 239.1, 249.1; 330/279, 129, 140; H04N 5/60, 5/62, 5/44, 5/50

(56) References Cited

U.S. PATENT DOCUMENTS

| | | | |
|---|---|---|---|
| 4,206,473 A | * 6/1980 | Isono et al. | 358/21 |
| 4,329,714 A | * 5/1982 | Pritchard | 358/198 |
| 4,370,520 A | * 1/1983 | Malchow | 179/1 |
| 4,396,949 A | 8/1983 | Meguro et al. | |
| 4,455,573 A | 6/1984 | Yamamoto et al. | |
| 4,480,335 A | * 10/1984 | Kishi | 455/212 |
| 4,511,924 A | 4/1985 | Griffis et al. | |
| 4,556,917 A | * 12/1985 | Shibata et al. | 358/343 |
| 4,581,643 A | * 4/1986 | Carlson | 358/191 |
| 4,652,924 A | * 3/1987 | Davidov | 358/197 |
| 5,073,976 A | * 12/1991 | Kennedy | 455/161 |
| 5,133,009 A | * 7/1992 | Rumreich | 380/10 |
| 5,175,883 A | 12/1992 | Ueno | |
| 5,267,272 A | * 11/1993 | Cai et al. | 375/98 |
| 5,859,664 A | * 1/1999 | Dent | 348/21 |
| 5,930,693 A | * 7/1999 | Kennedy et al. | 455/234.1 |
| 6,370,370 B1 | 4/2002 | Roth et al. | |

FOREIGN PATENT DOCUMENTS

| | | |
|---|---|---|
| DE | 31 47 760 A1 | 7/1982 |
| EP | 0 363 205 A2 | 4/1990 |
| JP | 62140569 | 6/1987 |
| JP | 6352356 | 4/1988 |
| JP | 7212674 | 8/1995 |

\* cited by examiner

*Primary Examiner*—John Miller
*Assistant Examiner*—Paulos Natnael
(74) *Attorney, Agent, or Firm*—Leydig, Voit & Mayer, Ltd.

(57) ABSTRACT

A semiconductor integrated circuit in which a band-pass filter, a sound detector, and some other circuits are formed on a single semiconductor substrate. The output signal from an AM detector is passed through a high-pass filter to obtain, substantially, an FM sound signal. A gain variable amplifier controls the amplitude of the FM sound signal and passes the signal through the band-pass filter to extract substantially, an FM sound carrier signal. The amplitude detector monitors the amplitude of the sound carrier signal and applies negative feedback to the gain variable amplifier so that the amplitude is kept constant. Thus, the influence of noise from the band-pass filter is reduced, and degradation of signal-to-noise ratio can be prevented.

13 Claims, 6 Drawing Sheets

FIG.7
PRIOR ART

BROADCAST SOUND SIGNAL PROCESSING CIRCUIT

FIELD OF THE INVENTION

The present invention relates to a semiconductor integrated circuit and more particularly, to a semiconductor integrated circuit which is preferably applied to a television sound signal processing circuit especially with an integrated filter circuit therein.

BACKGROUND OF THE INVENTION

Figure 4:
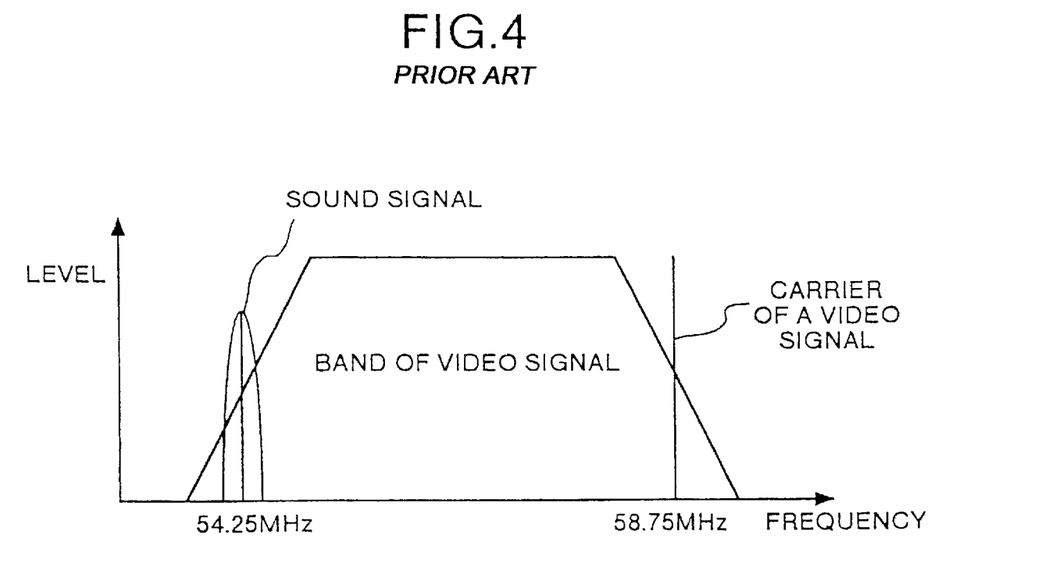
FIG. 4 is a characteristic diagram showing frequency allocation in a television signal.

FIG. 4 is a characteristic diagram showing frequency allocation in a television signal transmitted from a broadcasting station, and shows, in Japan, for instance, frequency allocation in a signal whose frequency is converted to a prespecified frequency within a low band by a tuner. In Japan, a carrier of a video signal is set to 58.75 MHz, and a carrier of a sound signal is set to 54.25 MHz which is lower by 4.5 MHz as compared to the carrier of the video signal.

Figure 5A:
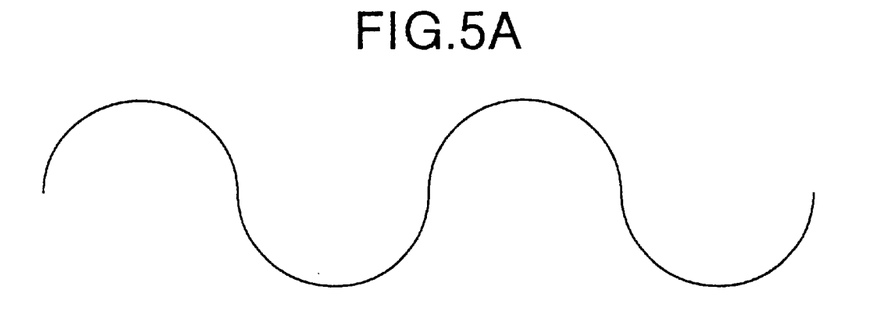
FIGS. 5A, 5B, 5C and 5D are waveform diagrams schematically showing a sound signal, a video signal, and a signal with these signals superimposed on each other.
Figure 5B:
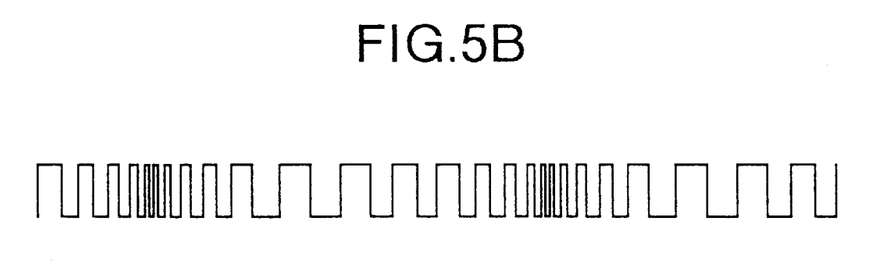
Figure 5C:
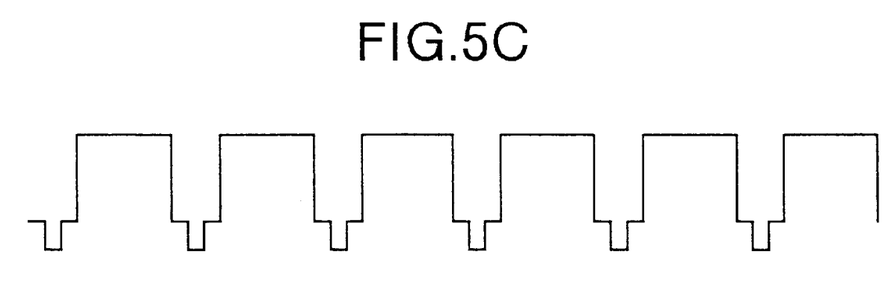
Figure 5D:
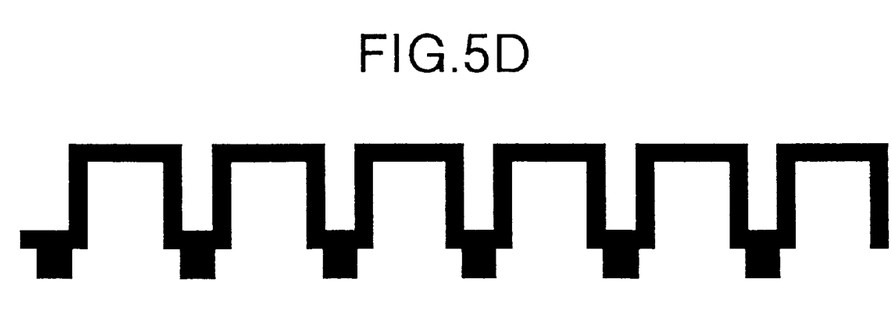

In Japan, as shown in FIG. 5, a sound carrier is FM-modulated with a sound signal (FIG. 5A), the FM-modulated signal (FIG. 5B) is superimposed on a composite video signal (FIG. 5C), and the carrier of 58.75 MHz is AM-modulated by the superimposed signal (FIG. 5D). The frequency of the sound carrier is different depending upon the system such as the NTSC system, the PAL system, and the SECAM system, and 5.5 MHz, 6.0 MHz, and 6.5 MHz are used as sound carriers other than 4.5 MHz.

Figure 6:
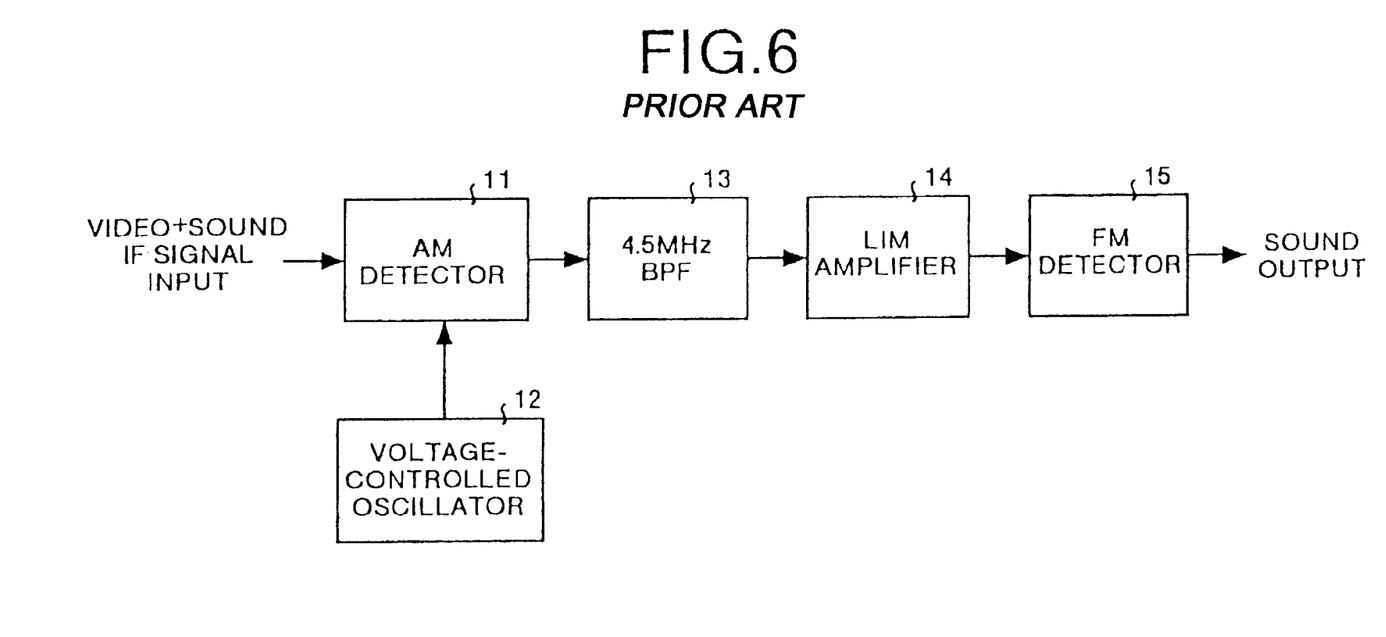
FIG. 6 is a block diagram showing a conventional type of sound carrier signal detector.

FIG. 6 is a block diagram showing a conventional type of detector for detecting a sound carrier signal of 4.5 MHz, and shows a detector based on a sound detecting system called an inter-carrier system. This detector comprises an AM detector 11, a voltage-controlled oscillator 12, a band-pass filter (BPF) 13 for 4.5 MHz, a limiter (LIM) amplifier 14, and an FM detector 15. Inputted into the AM detector 11 are a sound intermediate frequency (IF) signal superimposed on a video intermediate frequency (IF) signal and an output signal, whose frequency synchronizes to that of the video intermediate frequency signal for frequency conversion, from the voltage-controlled oscillator 12.

The AM detector 11 demodulates the video intermediate frequency signal and the sound intermediate frequency signal, and outputs a video signal and a sound FM signal at 4.5 MHz. As an AM detector 11, there is, for instance, a balanced modulator which outputs a sum and a difference of two input signals. For example, when frequencies of the sound intermediate frequency signal and that of the output signal from the voltage-controlled oscillator 12 are 54.25 MHz and 58.75 MHz respectively, the balanced modulator outputs signals of 4.5 MHz and 113 MHz.

Unwanted signal components excluding the sound FM signal in a low band are removed by the band-pass filter 13 from the output signals of the AM detector 11. The limiter amplifier 14 maintains the amplitude of the FM signals having passed through the band-pass filter at a constant amplitude, and the FM detector 15 FM-demodulates the FM signals and converts them to the original sound signals.

Figure 7:
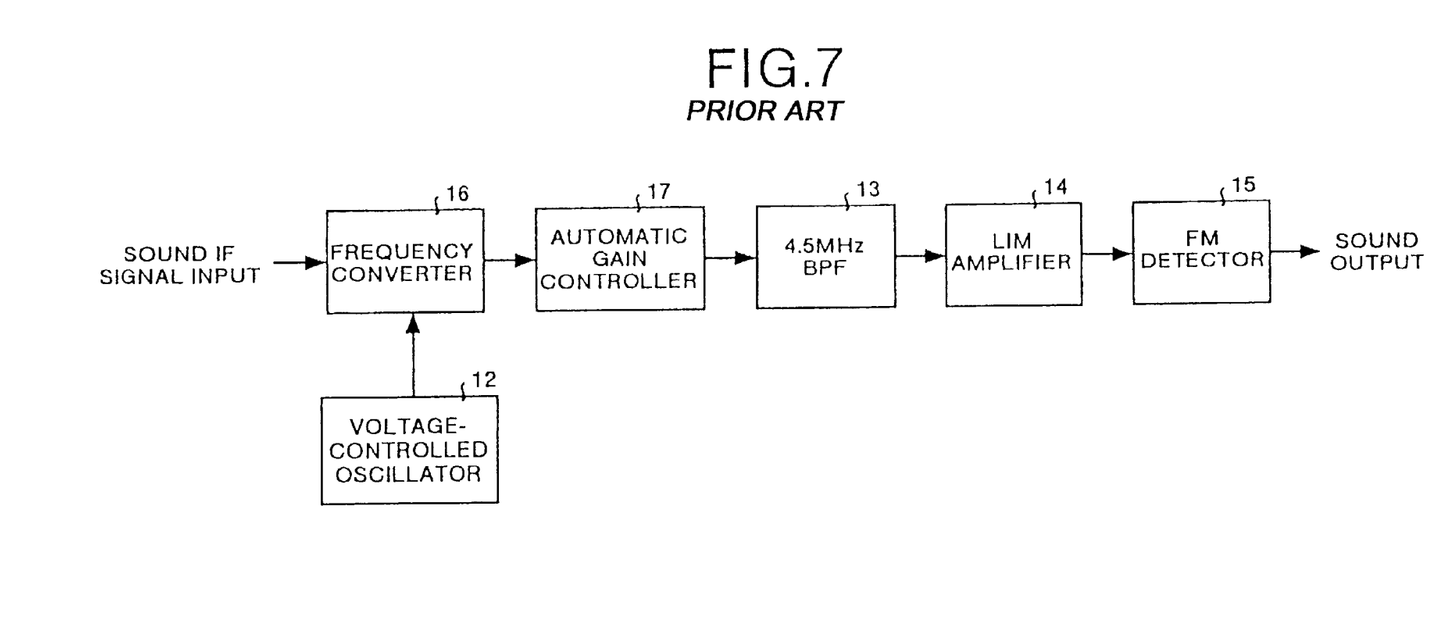
FIG. 7 is a block diagram showing another conventional type of sound carrier signal detector.

FIG. 7 is a block diagram showing a detector based on a sound detecting system called a split carrier system. This detector comprises a voltage-controlled oscillator 12, a band-pass filter (BPF) 13 for 4.5 MHz, a limiter (LIM) amplifier 14, an FM detector 15, a frequency converter 16, and an automatic gain controller 17. Inputted into the frequency converter 16 are a sound intermediate frequency signal with some video signal components removed by a SAW (surface acoustic wave) filter provided in the previous stage which is not shown and an output signal from the voltage-controlled oscillator 12.

The frequency converter 16 converts the sound intermediate frequency signal into a low sound FM signal with a frequency of 4.5 MHz or so. This converted sound FM signal substantially comprises only a sound carrier signal, and its amplitude is controlled to be constant by the automatic gain controller 17. The sound FM signal whose gain has been controlled is converted into an original sound signal by the FM detector 15 via the band-pass filter 13 and the limiter amplifier 14.

In the inter-carrier system, it is difficult to obtain sound carrier signals with constant amplitude when an amplitude ratio between a video intermediate frequency signal and a sound carrier signal of received signals or loss of a sound carrier in the SAW filter provided in the previous stage of the detector are different from each other. However, sound carrier signals with constant amplitude can be obtained in the split carrier system by providing automatic gain control specific to a sound carrier rather than the signals, and these signals can be sent to the FM detector 15.

Conventionally, the band-pass filter 13 has been an external component to a semiconductor integrated circuit comprising other circuits excluding this band-pass filter 13 in both the inter-carrier system and the split carrier system. However, when a detector is to be downsized by reducing the number of discrete components and also an integrated filter is to be provided in the semiconductor integrated circuit to make easier assembly of a circuit board for a television receiver, the following inconveniences may occur. Namely, the filter comprises a set of a passive element such as a resistor and a capacitor and an active element, but those elements generate noise. Therefore, when the filter is built in a semiconductor integrated circuit, the S/N (a signal-to-noise ratio) is degraded.

SUMMARY OF THE INVENTION

It is an object of the present invention to obtain, for the purpose of solving the problems described above, a semiconductor integrated circuit with an optimally integrated filter therein in both the split carrier system and the inter-carrier system without degradation of a signal-to-noise ratio.

In the present invention, a semiconductor integrated circuit comprises, on an identical semiconductor substrate, a band-pass filter for extracting only the signals within a substantially specified frequency band from the demodulated input signals, an automatic gain controller for detecting an amplitude of the signals extracted by the band-pass filter and controlling so as to keep the amplitude thereof constant, an amplitude detector for demodulating the signals having passed through the band-pass filter, and a switching element for switching the signal to be inputted into the automatic gain controller to a signal to be inputted into the band-pass filter or to a signal outputted from the band-pass filter, and the automatic gain controller is controlled by the amplitude detector according to output from the switching element.

Other objects and features of this invention will become understood from the following description with reference to the accompanying drawings.

DESCRIPTION OF THE PREFERRED EMBODIMENTS

Detailed description is made hereinafter for the preferred embodiment of the semiconductor integrated circuit according to the present invention with reference to the attached drawings.

Figure 1:
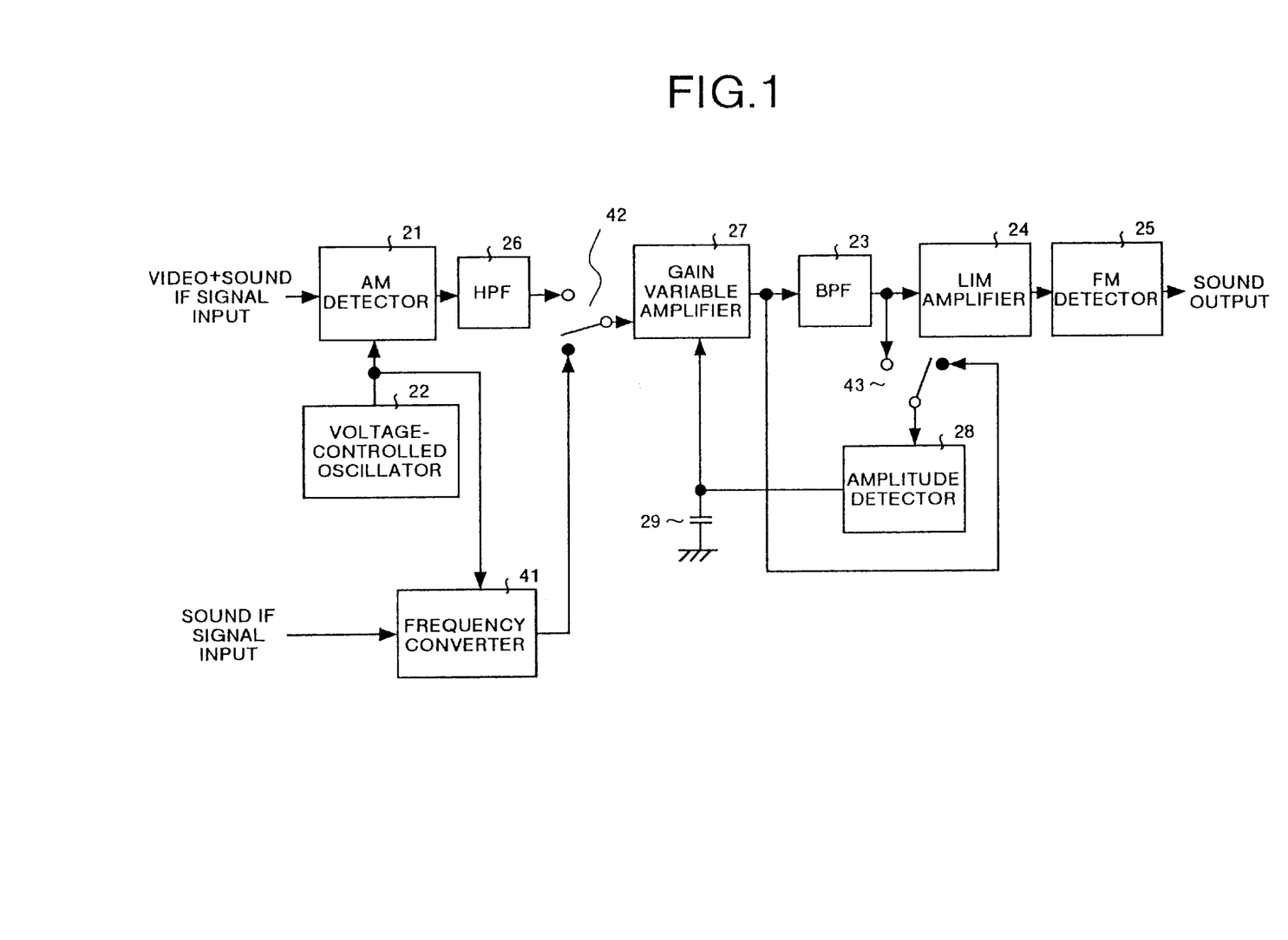
FIG. 1 is a block diagram showing an example of a sound detector for a television receiver with a semiconductor integrated circuit according to the present invention.

FIG. 1 is a block diagram showing an example of a sound detector for a television receiver destined for Japan with a semiconductor integrated circuit according to the present invention. This sound detector takes care of both the split carrier system and the inter-carrier system by switching. This detector comprises an AM detector 21, a voltage-controlled oscillator 22, a band-pass filter (BPF) 23 for 4.5 MHz or the like, a limiter (LIM) amplifier 24, an FM detector 25, a high-pass filter (HPF) 26, a gain variable amplifier 27, an amplitude detector 28, a loop filter 29, a frequency converter 41, and two selector switches 42, 43, each of which is formed on an identical semiconductor substrate.

The configuration and effects of the AM detector 21, voltage-controlled oscillator 22, band-pass filter 23, limiter amplifier 24, and FM detector 25 are the same as the AM detector 11, voltage-controlled oscillator 12, band-pass filter 13, limiter amplifier 14, and FM detector 15 of the conventional detector shown in FIG. 6, therefore, the rated description thereof is omitted.

The high-pass filter 26 extracts only a signal with components in a high band from the output signals from the AM detector 21, and outputs a sound carrier signal and a signal including high-band components of the video signal. The gain variable amplifier 27, amplitude detector 28, and the loop filter 29 form an automatic gain controller for controlling the amplitude of an output signal from the high-pass filter 26. The output of the high-pass filter 26 is inputted into the limiter amplifier 24 and amplitude detector 28 via the gain variable amplifier 27 and band-pass filter 23. The output of the amplitude detector 28 is inputted into the gain variable amplifier 27. It should be noted that the gain variable amplifier 27 and loop filter 29 are known in the art.

Figure 2A:
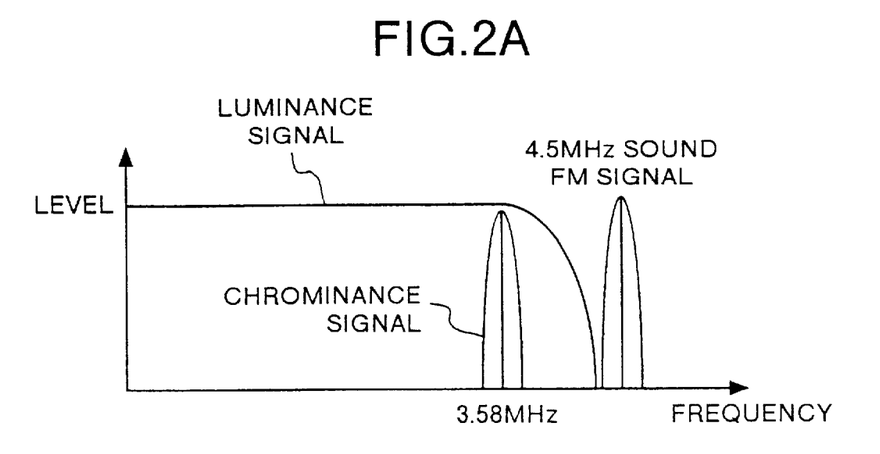
FIGS. 2A and 2B are characteristic diagrams each showing a spectrum of a signal outputted from the AM detector and the high-pass filter of the sound detector.
Figure 2B:
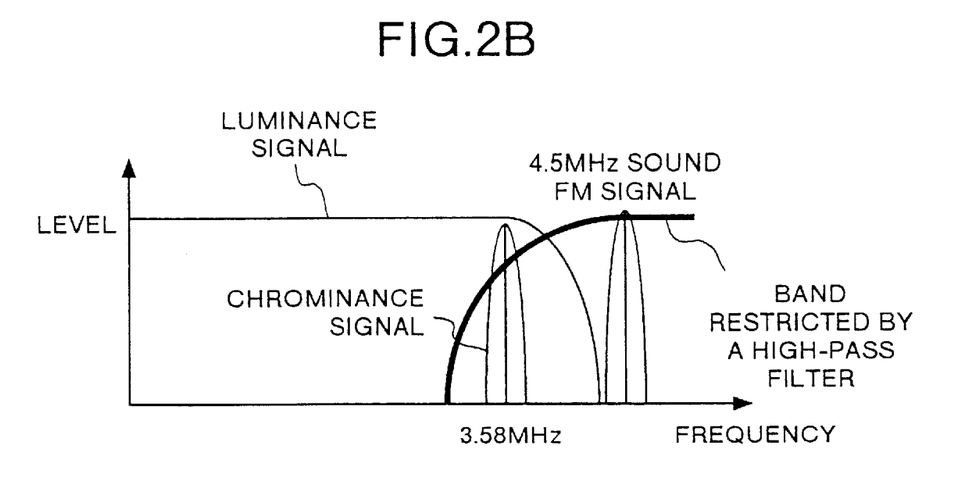

Next, description is made for the effects due to this embodiment. A signal with a sound intermediate frequency signal superimposed on a video intermediate frequency signal is demodulated by the AM detector 21. The output of the AM detector 21 includes, as shown in FIG. 2A, a wide-band video signal other than a sound FM signal that is originally required. As shown in FIG. 2B, the high-pass filter 26 provided in the next stage removes the unwanted signal component from this output signal.

The amplitude of an output signal from the high-pass filter 26 is controlled by the gain variable amplifier 27 in the next stage. The signal whose amplitude is controlled is inputted into the band-pass filter 23, while only a substantial sound carrier signal is extracted. The extracted sound carrier signal is converted into a sound and video signal by the limiter amplifier 24 and FM detector 25. The extracted sound carrier signal is also inputted into the amplitude detector 28 which along with the gain variable amplifier, controls the amplitude of the sound carrier signal.

Namely, the amplitude detector 28 monitors amplitude of only a sound carrier signal extracted by the band-pass filter 23. The gain variable amplifier 27 controls the amplitude of the sound carrier signal to be inputted into the band-pass filter 23 so as to maintain the amplitude constant according to but the monitored amplitude. With this feature, the influence of noise occurring in the band-pass filter 23 built in the semiconductor integrated circuit is reduced. The amplitude detector 28 monitors the amplitude of the output signal from the band-pass filter 23 to maintain constant the amplitude of the sound carrier signal as pure as possible.

Figure 3:
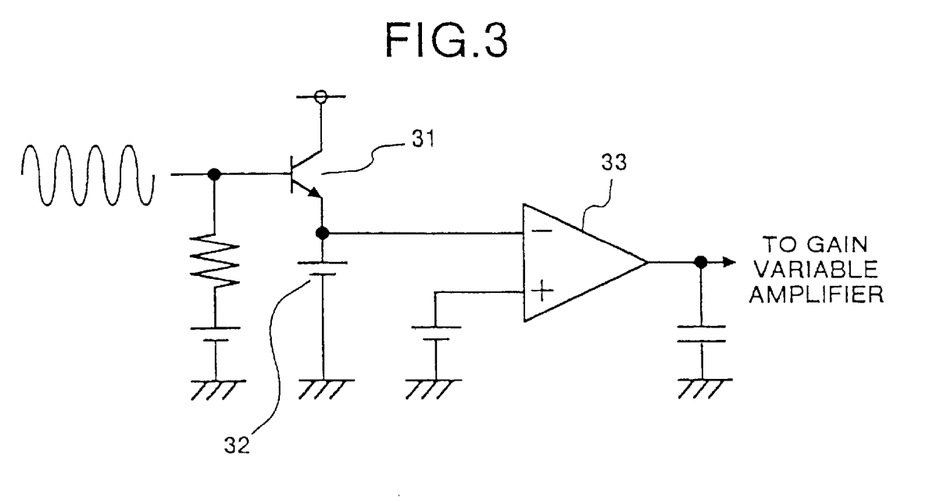
FIG. 3 is a circuit diagram showing an embodiment of the amplitude detector of the sound detector.

FIG. 3 is a circuit diagram showing an embodiment of the amplitude detector 28. The amplitude detector 28 comprises an emitter follower 31 and a capacitor 32 for converting an amplitude of a sound carrier signal to a DC voltage by performing peak detection of, for instance, a sound carrier signal superimposed on an appropriate DC voltage, and a comparator 33 for comparing the converted DC voltage with a reference potential and applying a negative feedback to the gain variable amplifier 27 in such a way that the sound carrier signal is equal to the reference potential.

Each of the selector switches 42, 43 comprises a switching element consisting of a component such as a transistor. The selector switch 42 switches the signal to be inputted into the gain variable amplifier 27 to the output signal from the frequency converter 41 in case of the split carrier system, and switches the signal to the output signal from the high-pass filter 26 in case of the inter-carrier system. The other selector switch 43 switches the signal to be inputted into the amplitude detector 28 to the output signal from the gain variable amplifier 27, namely to the input signal into the band-pass filter 23 in case of the split carrier system, and switches the signal to the output signal from the band-pass filter 23 in case of the inter-carrier system.

In the example shown in FIG. 1, the switches 42 and 43 are switched to the black dots in case of the split carrier system, and switched to the white dots in case of the inter-carrier system respectively.

When the split carrier system is selected, the configuration is the same as that based on the conventional technology shown in FIG. 7. However, the gain variable amplifier 27, amplitude detector 28, and loop filter 29 form the automatic gain controller, which corresponds to the conventional type of automatic gain controller 17 shown in FIG. 7. In case of the split carrier system, the signal is processed by being split into video and sound by the SAW filter not shown, so that there are fewer excess components, other than the sound carrier in the output signal from the frequency converter 41. Therefore, by switching with the switch 43, the output signal from the gain variable amplifier 27 is inputted into the amplitude detector 28, and negative feedback is applied to the gain variable amplifier 27 so as to keep the amplitude of the output signal constant.

With this embodiment, optimal characteristics can be obtained in both the split carrier system and the inter-carrier system. In general, a feedback route for automatic gain control should preferably be short. Therefore, feedback is provided from before the band-pass filter in the split carrier system in which the amplitude of the signal can be detected even before the signal is inputted into a band-pass filter, while feedback is provided from after the band-pass filter in the inter-carrier system in which the amplitude of the signal can not be detected because of mixed signals before their entering into the band-pass filter, so that it is possible to obtain an optimal characteristic in each of the systems respectively. As described above, even if the amplitude of the input signal changes, the input level of the signal to a band-pass filter can be kept constant by automatic gain control, so that the influence of noise produced by the band-pass filter can be reduced, which allows a signal-to-noise ratio to be kept favorable.

The present invention in the description above is applicable to a television receiver used in countries even other than Japan. Further, the present invention in the description above is applicable to a signal processing circuit comprising a semiconductor integrated circuit other than a sound detector for a television receiver.

As described above, a semiconductor integrated circuit of the present invention comprises, on an identical semiconductor substrate, a band-pass filter for extracting only the signals within a substantially specified frequency band from the demodulated input signals, an automatic gain controller for detecting the amplitude of the signals extracted by the band-pass filter and controlling so as to maintain the amplitude thereof constant, an amplitude detector for demodulating the signal having passed through the band-pass filter, and a switching element for switching the signal to be inputted into the automatic gain controller to a signal to be inputted into the band-pass filter or to a signal outputted from the band-pass filter. Thus, according to the present invention, it is possible to obtain a semiconductor integrated circuit in which, even if the amplitude of the input signal changes, an input level of the signal into a band-pass filter can be kept constant by automatic gain control, influence of noise produced by the band-pass filter can be reduced, and a signal-to-noise ratio can be kept favorable with a filter integrated optimally in each of the split carrier system and the inter-carrier system.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A semiconductor integrated circuit comprising, on a single semiconductor substrate:
    a variable-gain amplifier receiving an input signal and a gain signal and producing an amplitude-controlled output signal based on the gain signal;
    a band-pass filter receiving the amplitude-controlled output signal output by the variable-gain amplifier and extracting signals in a specified frequency band from the amplitude-controlled output signal to produce a filtered signal; and
    an amplitude detector receiving and detecting amplitude of the amplitude-controlled output signal output from the variable gain amplifier and producing the gain signal supplied to the variable-gain amplifier, wherein the amplitude detector comprises an emitter follower and a capacitor for converting a sound carrier signal into a converted DC voltage by peak detection of a sound carrier signal superimposed on a DC voltage, and a comparator for comparing the converted DC voltage with a reference potential and outputting the gain signal to the variable-gain amplifier so that the sound carrier signal is equal to the reference potential.

2. The semiconductor integrated circuit according to claim 1, comprising:
    a voltage controlled oscillator outputting a synchronized signal synchronized with a sound intermediate frequency signal of a broadcast sound signal; and
    a frequency converter receiving the sound intermediate frequency signal and the synchronized signal output from the voltage controlled oscillator, converting the sound intermediate frequency signal into a sound frequency modulated (FM) signal, and outputting the sound FM signal to the variable-gain amplifier as the input signal.

3. The semiconductor integrated circuit according to claim 1, comprising:
    a limiter amplifier receiving the filtered signal from the band-pass filter and adjusting amplitude of the filtered signal to output an amplitude-adjusted sound frequency modulated (FM) signal; and
    an FM detector receiving the amplitude-adjusted sound FM signal output from the limiter amplifier, converting the amplitude-adjusted sound FM signal into a sound output signal, and outputting the sound output signal.

4. The semiconductor integrated circuit according to claim 1, comprising a loop filter connected to at least one of the amplitude detector and the variable-gain amplifier.

5. A semiconductor integrated circuit comprising, on a single semiconductor substrate:
    a variable-gain amplifier receiving an input signal and a gain signal and producing an amplitude-controlled output signal based on the gain signal, wherein the input signal comprises both audio and video components;
    a first band-pass filter receiving the amplitude-controlled output signal output by the variable-gain amplifier and extracting a sound carrier signal from the amplitude-controlled output signal to produce a filtered signal; and
    an amplitude detector receiving the filtered signal output from the first band-pass filter and detecting amplitude of the filtered signal to produce the gain signal, and supplying the gain signal to the variable-gain amplifier, wherein the amplitude detector comprises
        an emitter follower and a capacitor for converting a sound carrier signal into a converted dc voltage by peak detection of a sound carrier signal superimposed on a DC voltage, and
        a comparator for comparing the converted DC voltage with a reference potential and outputting the gain signal to the variable-gain amplifier so that the sound carrier signal is equal to the reference potential.

6. The semiconductor integrated circuit according to claim 5, comprising:
    a voltage controlled oscillator outputting a synchronized signal synchronized with a sound intermediate frequency signal of a video and sound signal;
    an amplitude modulation (AM) detector demodulating the video and sound signal, based on the synchronized signal output from the voltage controlled oscillator, and outputting a sound frequency modulated (FM) signal; and
    a second band-pass filter receiving the sound FM signal, extracting signals in a specified frequency band from the sound FM signal to produce the input signal, and inputting the input signal to the variable-gain amplifier.

7. The semiconductor integrated circuit according to claim 5, comprising:
- a limiter amplifier receiving the filtered signal from the first band-pass filter and adjusting amplitude of the filtered signal to output an amplitude-adjusted sound frequency modulated (FM) signal; and
- an FM detector receiving the amplitude-adjusted sound FM signal output from the limiter amplifier, converting the amplitude-adjusted sound FM signal into a sound output signal, and outputting the sound output signal.

8. The semiconductor integrated circuit according to claim 5, comprising a loop filter connected to at least one of the amplitude detector and the variable-gain amplifier.

9. A semiconductor integrated circuit comprising, on a single semiconductor substrate:
- a variable-gain amplifier receiving an input signal and a gain signal and producing an amplitude-controlled output signal based on the gain signal;
- a first band-pass filter receiving the amplitude-controlled output signal output by the variable-gain amplifier and extracting signals in a specified frequency band from the amplitude-controlled output signal to produce a filtered signal; and
- an amplitude detector selectively receiving one of (i) the amplitude-controlled signal output from the variable-gain amplifier when the input signal is a split carrier signal and (ii) the filtered signal output from the band-pass filter when the input signal is an inter-carrier signal, and detecting amplitude of the signal received to produce the gain signal, and supplying the gain signal to the variable-gain amplifier.

10. The semiconductor integrated circuit according to claim 9, comprising
- switch for selectively inputting to the variable-gain amplifier one of a first input signal and a second input signal;
- circuitry for producing the first input signal and including
  - a voltage controlled oscillator outputting a synchronized signal synchronized with a sound intermediate frequency signal of a broadcast sound signal; and
  - a frequency converter receiving the sound intermediate frequency signal and the synchronized signal output from the voltage controlled oscillator, converting the sound intermediate frequency signal into a sound frequency modulated (FM) signal, and outputting the sound FM signal to the variable-gain amplifier as the first input signal; and
- circuitry for producing the second input signal and including
  - a voltage controlled oscillator outputting a synchronized signal synchronized with a sound intermediate frequency signal of a video and sound signal;
  - an amplitude modulation (AM) detector demodulating the video and sound signal, based on the synchronized signal output from the voltage controlled oscillator, and outputting a sound FM signal; and
  - a second band-pass filter receiving the sound FM signal, extracting signals in a specified frequency band from the sound FM signal to produce the second input signal, and inputting the second input signal to the variable-gain amplifier.

11. The semiconductor integrated circuit according to claim 9, comprising:
- a limiter amplifier receiving the filtered signal from the first band-pass filter and adjusting amplitude of the filtered signal to output an amplitude-adjusted sound frequency modulated (FM) signal; and
- an FM detector receiving the amplitude-adjusted sound FM signal output from the limiter amplifier, converting the amplitude-adjusted sound FM signal into a sound output signal, and outputting the sound output signal.

12. The semiconductor integrated circuit according to claim 9, comprising a loop filter connected to at least one of the amplitude detector and the variable-gain amplifier.

13. The semiconductor integrated circuit according to claim 9, wherein the amplitude detector comprises an emitter follower and a capacitor for converting a sound carrier signal into a converted DC voltage by peak detection of a sound carrier signal superimposed on a DC voltage, and a comparator for comparing the converted DC voltage with a reference potential and outputting the gain signal to the variable-gain amplifier so that the sound carrier signal is equal to the reference potential.

* * * * *